US012781877B2

(12) United States Patent
Jowers

(10) Patent No.: US 12,781,877 B2
(45) Date of Patent: Nov. 3, 2026

(54) DUAL HERMETICALLY SEALED RISING STEM VALVE

(71) Applicant: Southwest Research Institute, San Antonio, TX (US)

(72) Inventor: Christopher Jowers, Robbinsdale, MN (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 5 days.

(21) Appl. No.: 19/040,479

(22) Filed: Jan. 29, 2025

(65) Prior Publication Data

US 2026/0218812 A1 Jul. 30, 2026

(51) Int. Cl.
*F16K 41/10* (2006.01)
*F16K 31/53* (2006.01)

(52) U.S. Cl.
CPC .............. *F16K 41/10* (2013.01); *F16K 31/53* (2013.01)

(58) Field of Classification Search
CPC ................................. F16K 41/10; F16K 31/53
See application file for complete search history.

(56) References Cited

U.S. PATENT DOCUMENTS 4,274,444 A * 6/1981 Ruyak ................... F16K 31/047 403/DIG. 1
4,284,262 A * 8/1981 Ruyak ................... F16K 31/088 251/174
4,327,892 A * 5/1982 Ruyak ................... F16K 31/088 251/65
4,382,578 A * 5/1983 Ruyak ................... F16K 31/047 403/DIG. 1
4,557,153 A 12/1985 Ulbing
4,671,486 A * 6/1987 Giannini ............... F16K 31/088 251/267
4,940,207 A * 7/1990 Katsuyama ........... F16K 31/086 251/63.5

(Continued)

FOREIGN PATENT DOCUMENTS

WO 2024151931 7/2024
WO 2025014374 1/2025

OTHER PUBLICATIONS

International Search Report and Written Opinion for PCT Application No. PCT/US2026/012252, mailed Mar. 12, 2026, 8 pages.

*Primary Examiner* — Craig M Schneider
*Assistant Examiner* — Christopher D Ballman
(74) *Attorney, Agent, or Firm* — Secant IP, PLLC

(57) ABSTRACT

A rising stem valve having a valve operator, a valve stem, a rotary-to-linear strain wave gear set, a first hermetic seal, and a second hermetic seal. The rotary-to-linear strain wave gear set may have a rotary input driven by rotation of the valve operator and a linear output which translates linear motion to the valve stem. The first hermetic seal may be arranged between the valve operator and the rotary-to linear strain wave gear. The first hermetic seal may include an inner hub magnet assembly, an outer magnet assembly, and a cavity provided by an upstanding tubular wall, a cap and a horizontal flange. The outer hub magnet assembly may be magnetically coupled to the inner hub magnet assembly through the upstanding tubular wall such that the rotation of the valve operator can be translated through the upstanding tubular wall.

20 Claims, 6 Drawing Sheets

(56) References Cited

U.S. PATENT DOCUMENTS

| | | | | |
|---|---|---|---|---|
| 5,009,388 | A | 4/1991 | Pei-gi et al. | |
| 5,372,351 | A * | 12/1994 | Oliver | F16K 31/055 251/14 |
| 7,975,984 | B1 | 7/2011 | Novruzov et al. | |
| 8,297,315 | B2 * | 10/2012 | Esveldt | F16K 31/088 137/625.3 |
| 8,418,990 | B2 * | 4/2013 | Podstawka | B67C 3/28 251/65 |
| 8,690,119 | B2 * | 4/2014 | Burgess | F16K 31/088 251/215 |
| 9,080,685 | B2 * | 7/2015 | Quan | F16K 31/086 |
| 9,702,469 | B2 * | 7/2017 | Burgess | F16K 3/314 |
| 9,746,098 | B2 * | 8/2017 | Dubus | F16H 25/2252 |
| 10,436,330 | B2 * | 10/2019 | Hawa | F16K 39/024 |
| 11,047,498 | B2 * | 6/2021 | Decker | F16K 31/04 |
| 11,692,638 | B2 * | 7/2023 | Adams | F16H 25/20 251/129.11 |
| 2006/0180780 | A1 | 8/2006 | Arai et al. | |
| 2016/0138721 | A1 | 5/2016 | Burgess et al. | |
| 2023/0078223 | A1 * | 3/2023 | Barghoorn | F16K 7/126 251/129.11 |
| 2023/0400104 | A1 * | 12/2023 | Kurihara | F04B 27/18 |
| 2024/0142062 | A1 * | 5/2024 | West | F16K 31/60 |

* cited by examiner

DUAL HERMETICALLY SEALED RISING STEM VALVE

STATEMENT REGARDING FEDERALLY SPONSORED RESEARCH OR DEVELOPMENT

This invention was made with government support under Contract No. 89233018CNR000004 awarded by The Department of Energy through National Nuclear Security Administration—Navel Nuclear Laboratory. The government has certain rights in the invention.

FIELD

The present invention relates to a dual hermetically sealed valve operator for rising stem valves.

BACKGROUND

Rising stem valves provide a stem which raises and falls as a valve open (i.e., allows flow through a conduit) or closes (i.e., partially or fully obstructs flow through a conduit). Conduits may convey dangerous substances (e.g., gasses, vapors, or liquids). These substances may be harmful to the environment and/or pose health risks and safety hazards if allowed to escape, for example through a valve. These escaped substances are known in the field as fugitive emissions. It is important to have a resilient, reliable, and long-lasting means of reducing these fugitive emissions.

Conventional rising stem valves use packing seals or dynamic seals which comprise various materials to a prevent fugitive emissions through the valves. However, stem seals are subject to fluid process temperature and mechanical cycle operations and known to be prone to leaking due to degradation and wear over time. Some valves have been developed to include single hermetic elements such as a bellows-operated valve. A bellows-operated valve includes only a single hermetic element on the stem thus providing only a single point of failure. There is a need for a hermetically sealed valve operator which includes a hermetic seal between the operator attached to the valve.

SUMMARY

With the foregoing in mind, the present disclosure relates to a rising stem valve having a valve operator, a valve stem, a rotary-to-linear strain wave gear set, a first hermetic seal, and a second hermetic seal.

The rotary-to-linear strain wave gear set may have a rotary input driven by rotation of said valve operator and a linear output which translates linear motion to said valve stem. The first hermetic seal may be arranged between the valve operator and the rotary-to linear strain wave gear. The first hermetic seal may include an inner hub magnet assembly, an outer magnet assembly, and a cavity provided by an upstanding tubular wall, a cap extending over a first end portion of the tubular wall and a horizontal flange extending outwards from a second end portion of the tubular wall opposing the cap. The outer hub magnet assembly may be magnetically coupled to the inner hub magnet assembly through the upstanding tubular wall such that the rotation of the valve operator can be translated through the upstanding tubular wall. The outer hub magnet assembly may be physically isolated from said inner hub magnet assembly through the upstanding tubular wall. The second hermetic seal may include a bellows arranged around at least a portion of the valve stem.

BRIEF DESCRIPTION OF THE DRAWINGS

The abovementioned and other features of this disclosure, and the manner of attaining them, will become more apparent and better understood by reference to the following description of embodiment described herein taken in conjunction with the accompanying drawings, wherein.

DETAILED DESCRIPTION

With the foregoing in mind, the present disclosure generally relates to a dual hermetically sealed rising stem valve operator ("HSVO"). More specifically, the present disclosure relates to an HSVO having a first hermetic seal and a second hermetic seal.

Figure 1:
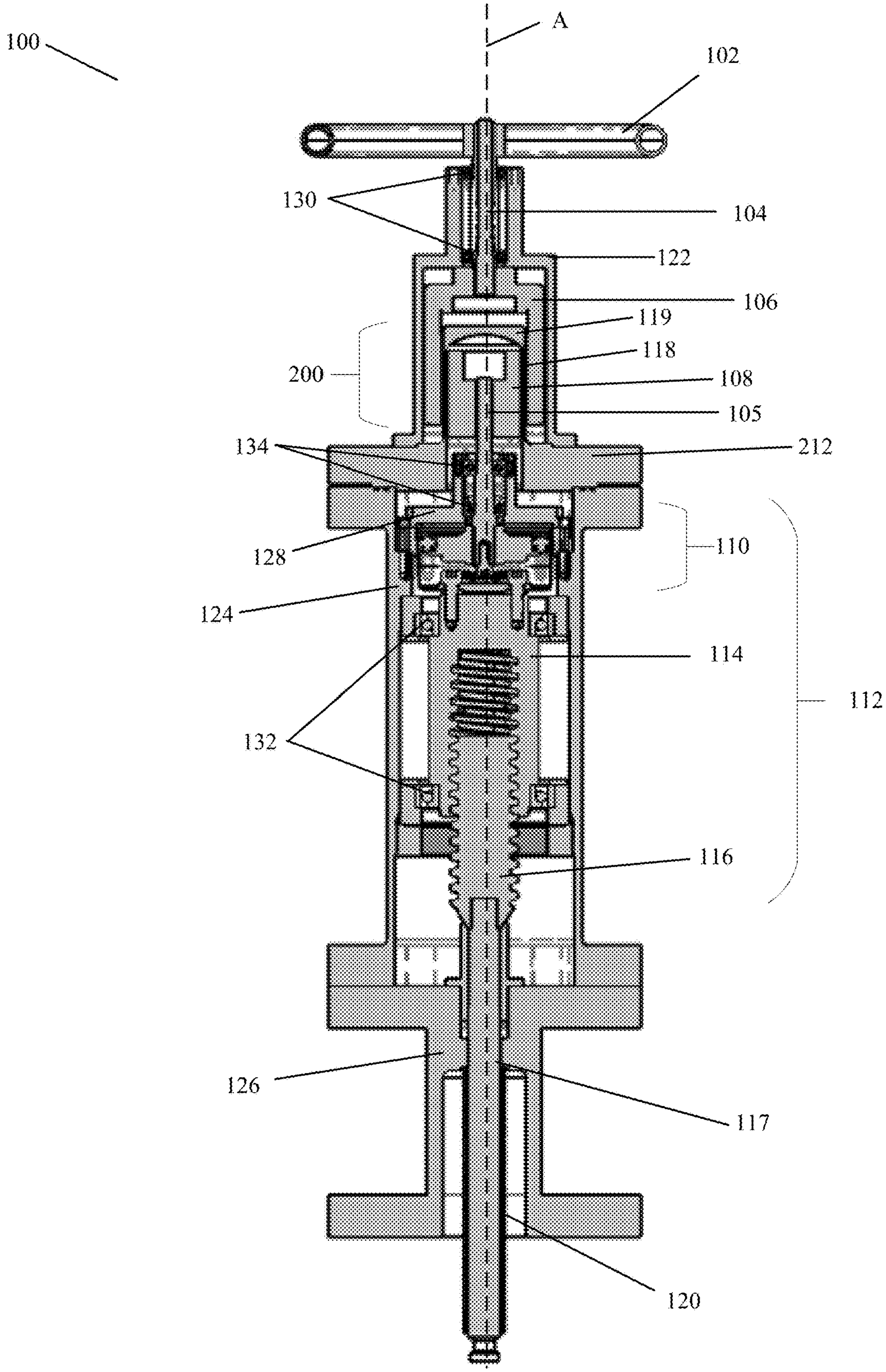
FIG. 1 depicts a cross-section of the dual hermetically sealed valve operator for a rising stem valve, consistent with the present disclosure.

An embodiment of the present disclosure is depicted in FIG. 1. As shown, the HSVO 100 includes an operator 102 which may be rotationally driven manually by a user or automatically by a motor.

The HSVO 100 may preferably include a first hermetic seal 200. The first hermetic seal 200, shown in detail in FIG. 2, may include an outer hub magnet assembly 106, an inner hub magnet assembly 108, and a cavity 210 provided by an upstanding tubular wall 118, a cap 119 extending over a first end portion of the tubular wall 118 and a horizontal flange 212 extending outwards from a second end portion of the tubular wall 118 opposing the cap 119. The tubular wall 118 may preferably be disposed between the outer hub magnet assembly 106 and the inner hub magnet assembly 108 such that the outer hub magnet assembly 106 and the inner hub magnet assembly 108 may be magnetically coupled while being physically isolated from one another. The outer hub magnet assembly 106 and the inner hub magnet assembly 108 are physically isolated from one another in that any fugitive emission which contact the inner hub magnet assembly 108 cannot contact the outer hub magnet assembly 106.

Figure 2:
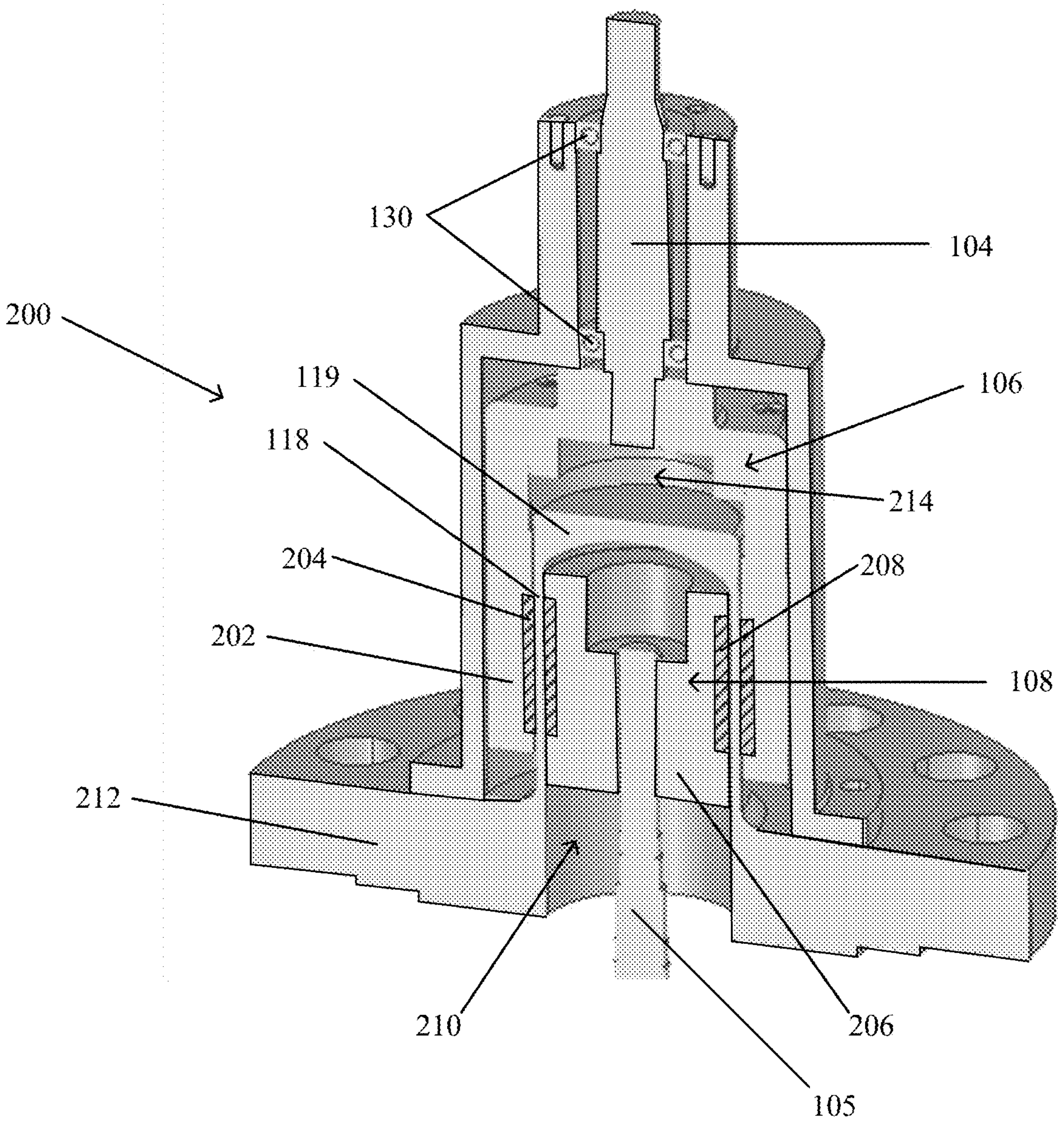
FIG. 2 depicts a cross-section of the first hermetic seal, consistent with the present disclosure.

As shown in FIG. 2, the outer hub magnet assembly 106 and the inner hub magnet assembly 108 preferably each comprise a main structural weldment 202, 206 and magnets 204, 208, respectively, contained therein. A structural weldment herein refers to a component having one or more features configured to house a magnet. The main structural weldments 202, 206 may preferably be comprised of metal, more preferably stainless steel. The magnets 204, 208 may preferably be magnets which have high temperature ratings (i.e., temperature ratings preferably of at least 700° F., more preferably of at least 600° F.). A temperature rating refers to the maximum temperature at which the magnets will operate before significantly losing its magnetic strength (i.e., the magnets magnetic strength is greater than or equal to a percentage of its room temperature strength, preferably in the range of 70% to 99%). More preferably, magnets 204, 208 may be Samarium-cobalt (SM—Co) magnets. The outer hub magnet assembly 106 and the inner hub magnet assembly 108 may preferably have a plurality of magnets 204, 208 disposed within the main structural weldment 202, 206 in the range of 1 to 20, more preferably 5 to 10. Preferably the main structural weldments 202, 206 may have a cylindrical geometry where the magnets 204, 208 are disposed about the longitudinal face of the main structural weldments 202, 206.

The cavity 210 may preferably be configured to fit over the inner hub magnet assembly 108. Further, the outer hub magnet assembly 106 may preferably include a central cavity 214. The outer hub magnet assembly central cavity 214 may preferably be configured to fit around the tubular wall 118. The magnets 204 of the outer hub magnet assembly 106 may preferably be magnetically coupled to the magnets 208 of the inner hub magnet assembly 108 through the tubular wall 118. The magnetic coupling between the outer hub magnet assembly 106 and the inner hub magnet assembly 108 may preferably have a maximum torque transmission capacity in the range of 50 N-m (Newton Meters) to 90 N-m, more preferably 60 N-m to 80 N-m. The ratio of the rotation of the outer magnet assembly 106 to the resulting rotation of the inner magnet assembly 108 is preferably in the range of 1:0.5 to 1:2, more preferably 1:1.

The cavity 210 may preferably have a pressure rating in the range of 2,000 pounds per square inch (psi) to 3,000 psi, more preferably in the range of 2,250 psi to 2,750 psi. The tubular wall 118 may preferably have a magnetic permeability in the range of 1.001 to 1.006, more preferably in the range of 1.003 to 1.004. The tubular wall 118, cap 119, and horizontal flange 212 may more specifically be comprised of, for example, Nitronic® 50 or Inconel® 718. The tubular wall 118 may have a wall thickness, at least in the regions through which the magnets 204 of the outer hub magnet assembly 106 and the magnets 208 of the inner hub magnet assembly 108 are magnetically coupled, in the range of 0.05 inches to 0.25 inches, more preferably in the range of 0.1 inches to 0.2 inches.

The outer hub magnet assembly 106 may preferably be mechanically coupled to the operator 102. Mechanically coupled as used herein refers to a physical connection between two or more components, for example by means of a fastener, weld, adhesive, etc. The operator 102 may preferably be mechanically coupled to the operator 102 through an outer input shaft 104 where a first end of the outer input shaft 104 may be mechanically coupled to the operator and a second end of the outer input shaft 104 may be mechanically coupled to the outer hub magnet assembly 106. Rotation of the operator 102 may preferably cause rotation of the outer input shaft 104 and/or of the outer hub magnet assembly 106 at preferably a ratio in the range of 1:0.5 to 1:2, more preferably 1:1.

Figure 3A:
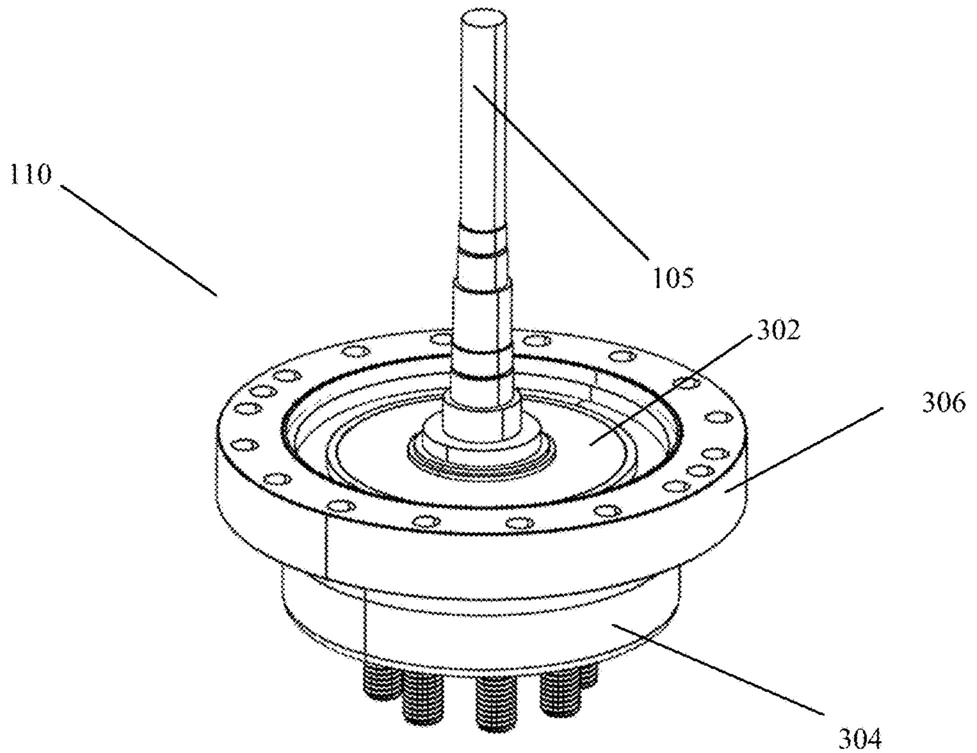
FIG. 3A depicts a perspective view of the strain wave gear set consistent with the present invention.
Figure 3B:
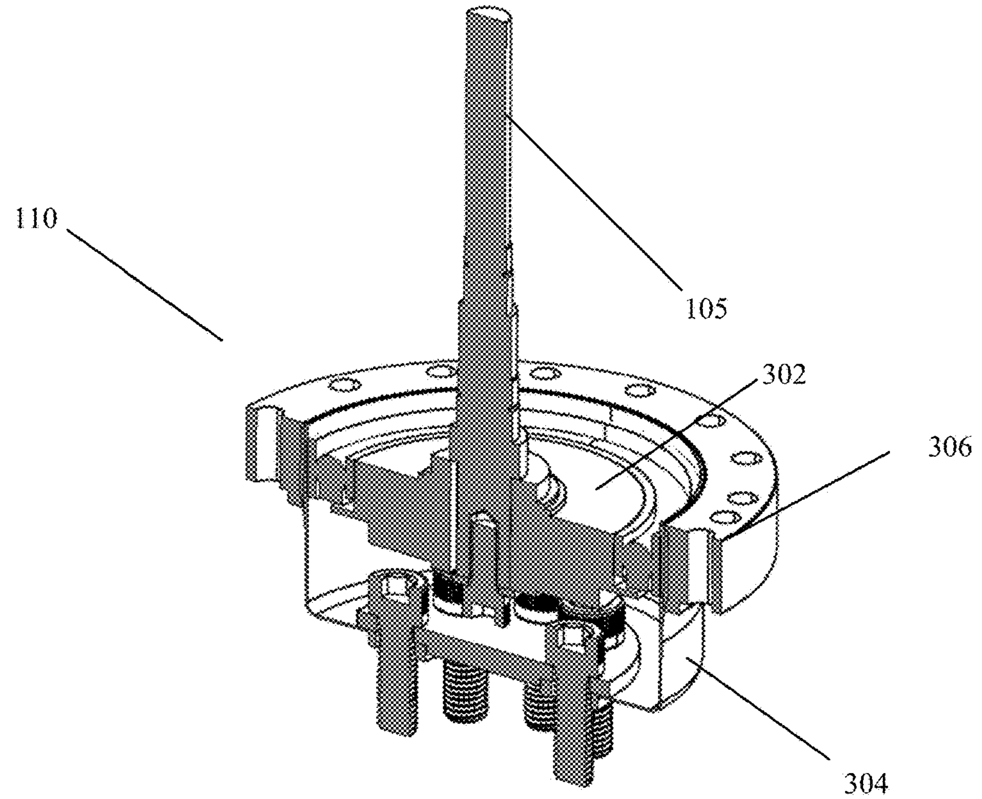
FIG. 3B depicts a cross-section of the perspective view of FIG. 3A.
Figure 3C:
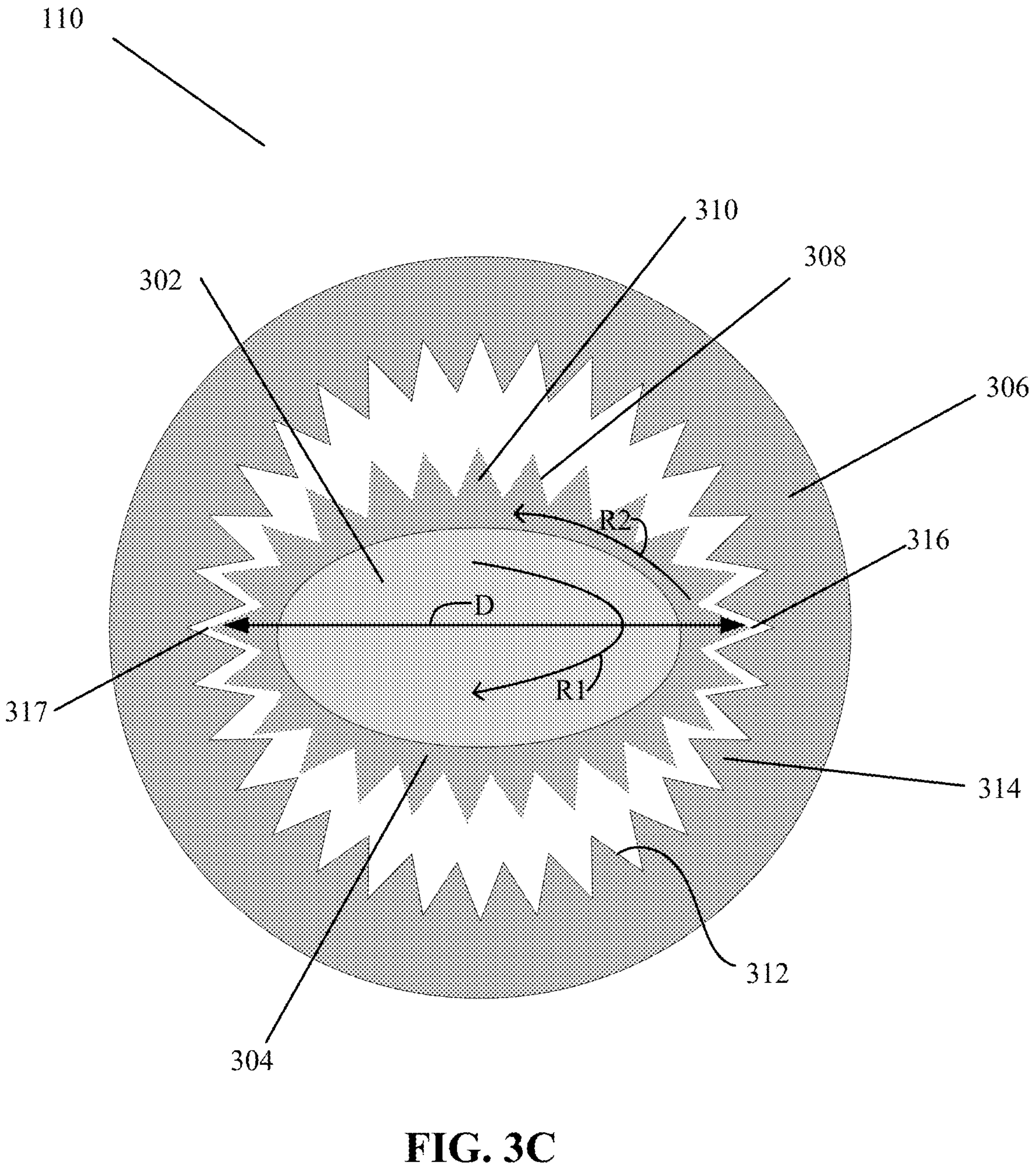
FIG. 3C depicts an illustrative representation of a strain wave gear set consistent with the present disclosure.

The HSVO 100 may further include a strain wave gear set (also referred to as a harmonic gear) 110. FIGS. 3A and 3B depict a strain wave gear set 110 consistent with the present embodiment. FIG. 3C depicts an illustrative representation of a strain wave gear set generally from a top view in order to better illustrate the various components of a strain wave gear set consistent with this disclosure.

The inner hub magnet assembly 108 may preferably be mechanically coupled to the strain wave gear set 110. The inner hub magnet assembly 108 may preferably be mechanically coupled to the strain wave gear set 110 through an inner input shaft 105, where a first end of an inner input shaft 105 is mechanically coupled to the inner hub magnet assembly 108 and a second end of the inner input shaft 105 is mechanically coupled to the strain wave gear set 110. Rotation of the inner magnet assembly 108 may preferably cause rotation of the inner input shaft 105 and/or the input of the strain wave gear set 110 at a ratio in the range of 1:0.5 to 1:2, more preferably 1:1.

A strain wave gear set 110 is understood to preferably include a wave generator 302, a flexspline 304, and a rigid circular spline 306. The wave generator 302 may preferably have an elliptical shape and may be encircled by the flexspline 304. The flexspline 304 may preferably have an external perimeter surface 308 which may include a plurality of teeth 310. Likewise, the rigid circular spline 306 may preferably have an inner perimeter surface 312 which may include a plurality of teeth 314. The rigid circular spline 306 may preferably include a larger quantity of teeth than the flexspline 304. The wave generator 302 may preferably cause the flexspline 304 to take on an elliptical shape such that the teeth 310 of the flexspline 304 at opposing poles along the widest diameter D of the elliptical flexspline 304 may engage the teeth 314 of the rigid circular spline 306. The regions where the teeth 310 of the flexspline 304 engage the teeth 314 of the rigid circular spline 306 may be referred to as the region of engagement 316, 317. As the wave generator 302 rotates in a first direction R1, the flexspline 304 may preferably be driven to rotate in a second direction R2 opposite the first direction R1. As the flexspline 304 and wave generator 302 rotate in opposing directions, the regions of engagement 316, 317 between the teeth of the flexspline and the teeth of the rigid circular spline may move along the inner perimeter surface 312 to the fixed rigid circular spline 306. Thus, as the wave generator 302 is rotationally driven in direction R1 at a first rate, the flexspline 304 may rotate within the rigid circular spline 306 in direction R2 at a second rate, where the second rate may preferably be slower than the first rate. The reduction ratio (i.e, the ratio between the rate of rotation of the wave generator 302 and the rate of rotation of flexspline 304) is preferably in the range of 50:1 to 130:1, more preferably in the range of 70:1 to 90:1.

The strain wave gear set 110 may preferably be a Harmonic Drive® with a CSG-65, 4340 alloy steel flexspline and heat-treated SAE 52100 ball bearings between the wave generator 302 and the flexspline 304.

The HSVO 100 may further include a rotary-to-linear strain wave gear set 112. The rotary-to-linear strain wave gear set 112 may preferably include the strain wave gear set 110, a power nut 114, and a drive screw 116. The rotary-to-linear strain wave gear set 112 may preferably be configured to transform the rotation of the wave generator 302 into linear movement of the drive screw 116. The power nut 114 is preferably mechanically coupled to the flexspline 304. Through the mechanical coupling of the flexspline 304 and the power nut 114, the rotation of the flexspline 304 may preferably be translated into rotation of the power nut 114 at a ratio preferably in the range of 1:0.5 to 1:2, more preferably 1:1.

The power nut 114 may preferably include internal threads which may preferably be threaded with external threads of the drive screw 116 such that at least a portion of the drive screw 116 may be within at least a portion of the power nut 114. Rotation of the power nut 114 may preferably cause the drive screw 116 to withdraw or advance into the power nut 114 thereby creating linear motion of the drive screw 116.

The rotation of the operator 102 which may be translated through the first hermetic seal 200 to the wave generator 302 of the rotary-to-linear strain wave gear set 112 may be referred to as the rotary input of the rotary-to-linear strain wave gear set 112. The linear motion of the drive screw 116 which may be translated to a valve stem 117 (as discussed below) may be referred to as the linear output of the rotary-to-linear strain wave gear set 112.

The internal threads of the power nut 114 and the external threads of the drive screw 116 may preferably have trapezoidal cross-sectional geometries. However, internal threads of the power nut 114 and the external threads of the drive screw 116 are not limited to a trapezoidal cross-sectional geometry and may comprise various geometries. The internal threads of the power nut 114 and the external threads of the drive screw 116 may preferably be single start ACME threads. The internal treads of the power nut 114 and the external threads of the drive screw 116 may preferably have a lead angle in the range of 3.6° to 4.2° so as to obtain a preferred thread transfer efficiency while preventing back drive and therefore act as a break. The drive screw 116 mated to the power nut 114 may preferably be able to provide a peak axial load in the range of 20,000 lbf (pound force) to 40,000 lbf, more preferably in the range of 28,000 lbf to 32,000 lbf. As used herein and as understood in the field, the peak axial load refers to the maximum axial load that can be applied to the screw parallel to the screw's axis of rotation, in either direction, before the threads of the screw seizes within the nut.

The power nut 114 may preferably be comprised of a bronze alloy. More specifically, the power nut 114 may preferably be comprised of a spinodally hardened copper nickel tin alloy such as, for example, a high-strength bronze alloy ToughMet® 3 AT 110. The drive screw 116 may preferably be comprised of a steel allow with high-strength and high fracture toughness, such as, for example, 4340 Alloy Steel.

The HSVO 100 may include the use of a relatively high temperature lubricant within the strain wave gear set 110 between said components (i.e., wave generator 302, flexspline 304, and/or rigid circular spline 306) and/or between the internal threads of the power nut 114 and the external threads of the drive screw 116. The relatively high temperature lubricant may be a liquid or a dry lubricant (i.e., a coating). The relatively high temperature lubricant may preferably have an upper temperature limit in the range of 400° F. to 600° F., more preferably in the range of 500° F. to 600° F. The relatively high temperature lubricant may preferably be non-moly based and may be synthetic ester based.

The HSVO 100 may preferably further include a valve stem 117 having a first end mechanically coupled to the drive screw 116 such that the linear motion of the drive screw 116 may be translated into linear motion of the valve stem 117. The valve stem 117 may preferably have a second end configured to be mechanically coupled to a valve mechanism (not shown).

The operator 102, the outer input shaft 104, the outer hub magnetic assembly 106, the inner hub magnetic assembly 108, the inner input shaft 105, the wave generator 302, the flexspline 304, and the power nut 114 may preferably rotate about the central axis of rotation A. The drive screw 116 and the valve stem 117 may preferably translate along the central axis of rotation A.

The HSVO 100 may be configured to open and close a valve mechanism of a rising stem valve, for example, an isolation valve, a gate valve (e.g., wedge, slab, etc.), a ball valve, a control valve, a globe valve, a plug and cage valve, etc.

Figure 4A:
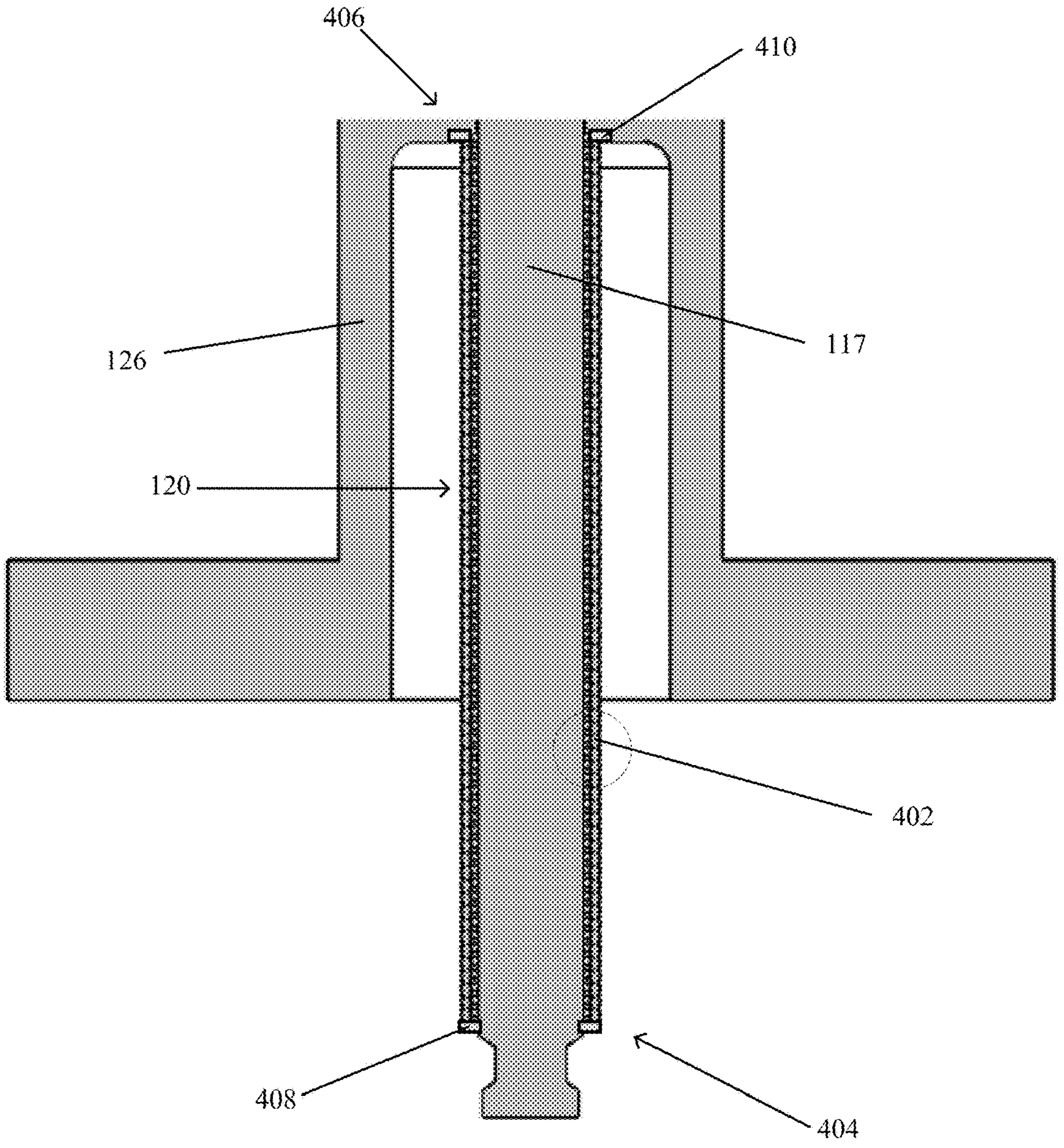
FIGS. 4A & 4B depict a cross-section of the second hermetic seal, consistent with the present disclosure.
Figure 4B:
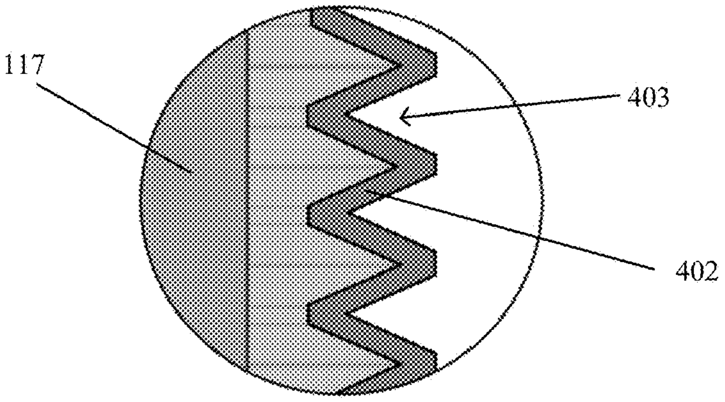

The HSVO 100 may preferably further include a second hermetic seal, more specifically a bellows 120 around the valve stem 117 along a portion of the longitudinal length of the valve stem 117. A bellows 120, as shown in FIGS. 4A & B, may preferably include a hollow tube 402 having a plurality of accordion folds 403 along the hollow tube's longitudinal length. The accordion folds 403 may preferably allow the hollow tube 402 to compress and expand longitudinally in a spring like manner. The hollow tube 402 of the bellows 120 preferably fits around the valve stem 114. The hollow tube 402 may also preferably include a first end 404 and a second end 406. The first end 404 may preferably include a mounting structure 408 which may preferably be mechanically coupled to a housing that contains a portion of the valve stem. More specifically housing to which the mounting structure 408 may preferably be mechanically coupled may be the valve bellows bonnet 126 discussed in more detail below. The mechanical coupling between the mounting structure 408 and the valve bellows bonnet 126 may, for example, be a weld. The second end 406 may preferably include a mounting structure 410. The mounting structure 410 may preferably be mechanically coupled to the valve stem 117. The mechanical coupling between the mounting structure 410 and the valve stem 117 may, for example, be a weld. Thus, as the valve stem 117 translates along the central axis A, the bellows 120 may expand and contract along the same axis while maintaining a hermetic seal between environment within and above the bellows 120 and the environment outside and below the bellows 120.

The bellows 120 may preferably have a pressure differential maximum (i.e., the pressure difference between the portion of the HSVO 100 above the bellows 120 and the portion of the HSVO below the bellows 120) in the range of 2,000 psi to 3,000 psi, more preferably 2,250 psi to 2,750 psi. The bellows 120 may preferably have a maximum stroke in the range of 3 inches to 5 inches, more preferably in the range of 3.5 inches to 4.5 inches. The bellows 120 may preferably have a maximum operating temperature in the range of 400° F. to 600° F., more preferably in the range of 500° F. to 600° F. The bellows spring rate of the bellows 120 may preferably be in the range of 30 pound-force per inch (lbf/in) to 50 lbf/inch, more preferably in the range of 35 lbf/in to 45 lbf/in. The bellows 120 may preferably be comprised of nickel chromium alloy such as, for example, Inconel® 718 AMS 5596.

The bellows 120 may preferably be welded to the outer diameter of the valve stem 117. The valve stem 117 may preferably comprises a material compatible with welding the bellows 120 thereto, such as a nickel chromium alloy (e.g., Inconel® 718 AMS 5596).

The HSVO 100 may preferably include one or more housings configured to contain and support the components housed therein. More specifically, the HSVO 100 may include an outer magnetic coupling housing 122, an operator body 124, a valve bellows bonnet 126 and/or an inner input shaft bearing housing 128. The outer magnetic coupling housing 122 may preferably contain a portion of the tubular wall 118, the cap 119, and a portion of the outer input shaft 104. The outer magnetic coupling housing 122 may preferably additionally include one or more bearings 130 configured to support the outer input shaft such that the outer input shaft may rotate about a central axis of rotation A but may not translate along any axis perpendicular to the central axis A or rotate about any axis perpendicular to the central axis A.

Figure 5:
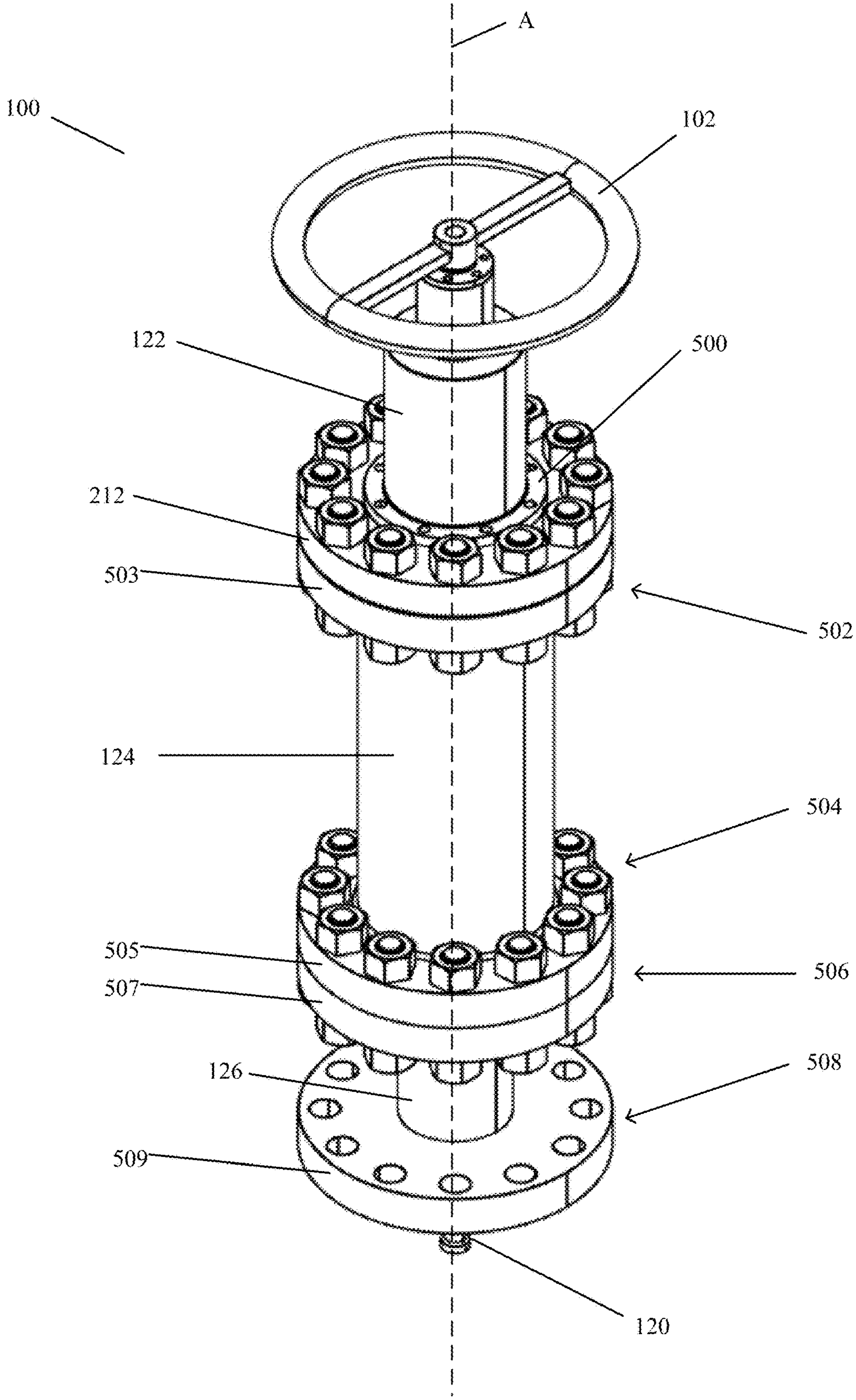
FIG. 5 depicts a perspective view of the dual hermetically sealed valve operator for a rising stem valve, consistent with the present disclosure.

The outer magnetic coupling housing 122 may be mechanically coupled to the horizonal flange 212. For example, the outer magnetic coupling housing 122 may include a flange 500 which may be mechanically coupled (e.g., bolted) to the horizontal flange 212, as shown in FIG. 5.

The operator body 124 may preferably contain a portion of the inner input shaft 105, the inner input shaft bearing housing 128, the rotary-to-linear strain wave gear set 112, and a portion of the valve stem 117. The inner input shaft bearing housing 128 may preferably include one or more bearings 134 and a portion of the inner input shaft 105 where the bearings 134 are configured to support the inner input shaft 105 such that the inner input shaft 105 may rotate about the central axis A but may not translate along any axis perpendicular to the central axis A or rotate about any axis perpendicular to the central axis A. The operator body 124 may preferably include one or more bearings 132 configured to support the power nut 114 such that the power nut 114 may rotate about the central axis A but may not translate along or rotate about any axis perpendicular to the central axis A.

The operator body 124 may preferably be mechanically coupled to the horizontal flange 212 at a first end 502 and mechanically coupled to the valve bellows bonnet 126 at a second end 504. For example, the operator body 124 may include a top flange 503 at the first end 502 and a bottom flange 505 at the second end 504, where the top flange 503 may be mechanically coupled (e.g., bolted) to the horizontal flange 212 and the bottom flange 505 may be mechanically coupled (e.g., bolted) to the valve bellows bonnet 126.

The valve bellows bonnet 126 may preferably contain a portion of the valve stem 117 and the bellows 120. Where the valve bellows bonnet 126 may be mechanically coupled to the second end 504 of the operator body 124, the valve bellows bonnet 126 may, for example, include a first end 506 with a top flange 507 where the top flange 507 of the valve bellows bonnet 126 may be bolted to a bottom flange 505 of the operator body 124. Additionally, the valve bellows bonnet 126 may preferably include a mating feature 509 at a second end 508 configured to mate with a portion of a conduit on which the HSVO 100 may be installed. For example, as shown in FIG. 5, the valve bellows bonnet 126 may include a bottom flange 509 at the second end 508 having through holes configured to accept bolts to connect the valve bellows bonnet 126 to a conduit.

What is claimed is:

1. A dual hermetically sealed valve operator for rising stem valves, comprising:
- a valve operator;
- a valve stem;
- a rotary-to-linear strain wave gear set having a rotary input driven by rotation of said valve operator and a linear output which translates linear motion to said valve stem;
- a first hermetic seal arranged between said valve operator and said rotary-to-linear strain wave gear, comprising,
  - an outer hub magnet assembly,
  - an inner hub magnet assembly, and
  - a cavity provided by an upstanding tubular wall, a cap extending over a first end portion of the tubular wall and a horizontal flange extending outwards from a second end portion of the tubular wall opposing the cap,
    - wherein said outer hub magnet assembly is magnetically coupled to said inner hub magnet assembly through said upstanding tubular wall such that said rotation of said valve operator can be translated through said upstanding tubular wall and said outer hub magnet assembly is physically isolated from said inner hub magnet assembly; and
- a second hermetic seal arranged around at least a portion of said valve stem, comprising a bellows.

2. The dual hermetically sealed valve operator for rising stem valves of claim 1, wherein the outer hub magnet assembly includes a main structural weldment and one or more magnets.

3. The dual hermetically sealed valve operator for rising stem valves of claim 2, wherein the main structural weldment of the outer hub magnet assembly comprises stainless steel.

4. The dual hermetically sealed valve operator for rising stem valves of claim 2, wherein the one or more magnets of the outer hub magnet assembly have a temperature rating of at least 600° F.

5. The dual hermetically sealed valve operator for rising stem valves of claim 4, wherein the one or more magnets of the outer hub magnet assembly are Samarium-cobalt magnets.

6. The dual hermetically sealed valve operator for rising stem valves of claim 1, wherein the inner hub magnet assembly includes a main structural weldment and one or more magnets.

7. The dual hermetically sealed valve operator for rising stem valves of claim 6, wherein the main structural weldment of the inner hub magnet assembly comprises stainless steel.

8. The dual hermetically sealed valve operator for rising stem valves of claim 6, wherein the one or more magnets of the inner hub magnet assembly have a temperature rating of at least 600° F.

9. The dual hermetically sealed valve operator for rising stem valves of claim 8, wherein the one or more magnets of the inner hub magnet assembly are Samarium-cobalt magnets.

10. The dual hermetically sealed valve operator for rising stem valves of claim 1, wherein the magnetic coupling between said outer hub magnet assembly and said inner hub magnet assembly has a maximum torque transmission capacity in the range of 60 N-m to 80 N-m.

11. The dual hermetically sealed valve operator for rising stem valves of claim 1, wherein the cavity has a pressure rating in the range of 2,250 psi to 2,750 psi.

12. The dual hermetically sealed valve operator for rising stem valves of claim 1, wherein the tubular wall has a magnetic permeability in the range of 1.003 to 1.004.

13. The dual hermetically sealed valve operator for rising stem valves of claim 1, wherein reduction ratio of said rotary-to linear strain wave gear set is in the range of 70:1 to 90:1.

14. The dual hermetically sealed valve operator for rising stem valves of claim 1, wherein the rotary-to-linear strain wave gear set includes a power nut and a drive screw, wherein rotation of said power nut causes linear motion of the drive screw.

15. The dual hermetically sealed valve operator for rising stem valves of claim 14, wherein the power nut has internal threads and the drive screw has external threads, said internal and external threads having trapezoidal cross-sectional geometries.

16. The dual hermetically sealed valve operator for rising stem valves of claim 15, wherein the internal threads of said power nut and the external threads of said drive screw are single start ACME threads.

17. The dual hermetically sealed valve operator for rising stem valves of claim 15, wherein the internal threads of said power nut and the external threads of said drive screw have a lead angle in the range of 3.6° to 4.2°.

18. The dual hermetically sealed valve operator for rising stem valves of claim 14, wherein the drive screw is comprised of a spinodally hardened copper nickel tin alloy.

19. The dual hermetically sealed valve operator for rising stem valves of claim 14, wherein the peak axial load on the drive screw is in the range of 28,000 psi to 32,000 psi.

20. The dual hermetically sealed valve operator for rising stem valves of claim 1, wherein the bellows has a pressure differential maximum in the range of 2,250 psi to 2,750 psi.

* * * * *